United States Patent

Ronci et al.

Patent Number: 5,611,265
Date of Patent: Mar. 18, 1997

[54] COMBINATION CHARBROILER AND FRYER WITH SPINNING FOOD BASKET

[76] Inventors: Fernando F. Ronci, 61 Reservoir Rd., Lincoln, R.I. 02865; Alan P. Pepin, 21 Great Cedar Swamp Rd., Rehoboth, Mass. 02769

[21] Appl. No.: 713,836

[22] Filed: Sep. 13, 1996

[51] Int. Cl.[6] ............................. A47J 37/10; A47J 37/12
[52] U.S. Cl. ................. 99/353; 99/357; 99/407; 99/409; 99/410; 99/511
[58] Field of Search ............... 99/403, 407–410, 99/411–418, 352–355, 357, 348; 426/464, 518, 523, 637, 438, 473; 241/92; 210/DIG. 8, 167

[56] References Cited

U.S. PATENT DOCUMENTS

| | | | |
|---|---|---|---|
| 241,631 | 5/1988 | Duffy | 99/414 |
| 1,759,921 | 5/1930 | Tarpley | 99/413 |
| 2,186,345 | 1/1940 | Reidenbach | 99/353 |
| 2,628,762 | 2/1953 | Hilldale | 99/413 |
| 2,858,762 | 11/1958 | Wade | 99/348 |
| 3,078,986 | 2/1963 | Arvan | 99/407 |
| 3,200,737 | 8/1965 | Ferenc | 99/410 |
| 3,279,353 | 10/1966 | Shelor | 99/407 |
| 3,357,685 | 12/1967 | Stephens | 99/348 |
| 4,187,770 | 2/1980 | Coffield | 99/353 |
| 4,196,660 | 4/1980 | Steinberg | 99/353 |
| 5,010,805 | 4/1991 | Ferrara | 99/353 |
| 5,168,797 | 12/1992 | Wang | 99/409 X |

Primary Examiner—Timothy F. Simone
Attorney, Agent, or Firm—Barlow & Barlow, Ltd.

[57] ABSTRACT

A combination fryer and charbroiler food cooking apparatus is provided. The food basket is slideably mounted to a centering rod mounted to a cooking oil container. The basket is moveable from a lower frying position to an upper spinning and/or charbroiling position. In the upper position, the basket is spun about its central axis to spin out unwanted excess fat, oil and grease. The food basket accommodates an insert food support for receiving a charbroil cover which includes charbroiling cooking elements. Upon installation of a charbroil cover, the charbroiling elements are positioned between upstanding food items residing in the insert food support. As a result, effective frying, charbroiling and removal of fat can be achieved.

14 Claims, 13 Drawing Sheets

COMBINATION CHARBROILER AND FRYER WITH SPINNING FOOD BASKET

BACKGROUND OF THE INVENTION

The present invention relates generally to an apparatus for cooking food. More specifically, the present invention relates to a combination charbroiler and fryer cooking apparatus which includes a spinning food basket to reduce the fat and grease content of foods cooked in the apparatus.

In the food industry, there is an ever increasing concern over the amount of fat in one's diet. In particular, a low fat diet is particularly desirable in light of the related health concerns. Certain foods are particularly high in fat either due to the food itself or the method by which it is cooked. Various foods, although healthy in an uncooked state, can become extremely unhealthy due to the introduction of fat as a result of the particular cooking process. For example, the deep frying cooking method introduces additional fat into the food which typically cannot be removed and is therefore consumed. Moreover, the deep frying method cooks the food in a particularly desirable fashion giving it a certain taste and texture. However, the high fat content makes such a cooking method highly undesirable.

In addition, the charbroiling method of cooking food is also desirable to realize a particular desired taste and texture of food. In similar fashion to deep frying foods, the charbroiling method for cooking food often causes foods to retain the fats and greases inherent in the food product itself. As a result, conventional charbroiling may be also undesirable in light of the health concerns discussed above.

In view of the foregoing health concerns over various common cooking methods, various attempts have been made in the prior art to address these concerns. For example, a number of devices have been attempted which combine both the frying of goods in a heated cooking oil and then separating the cooking oil from the fried foods using a centrifugal means. In addition, other apparatuses provide food to be fried within a porous container which is lowered into hot cooking oil. After the cooking oil is completed, the porous container is raised above the level of the cooking oil and then the container is manually spun to cause the cooking oil to separate from the fried food product. Further, other devices include lowering food materials into hot frying oil within a frying compartment for frying under low pressure or vacuum. The container is then rotated by a motor at low speed during the frying period. After the frying oil has been withdrawn from the frying compartment, the container is rotated at relatively high speed to separate the absorbed oil from the food under the same low pressure. Still further, salad spinners have been provided which enable excess water to be separated from the salad greens without damaging them.

Despite these attempts in the prior art, there is a need for a cooking apparatus which can both fry and charbroil foods with minor modification to the cooking device. Further, it is desirable for a cooking apparatus to be able to charbroil any type of food yet still be able to employ variable high speed spinning to reduce the fat content of the food during or after cooking.

SUMMARY OF THE INVENTION

The present invention preserves the advantages of prior art fryer and charbroiler food cooking apparatuses. In addition, it provides new advantages not found in currently available food cooking apparatuses and overcomes many disadvantages of such currently available apparatuses.

The invention is generally directed to a novel and unique combination fryer and charbroiler food cooking apparatus with particular application in reducing the fat content of foods to provide a more healthy food product while retaining many of the desirable features, such as taste and texture, of typically unhealthy cooking methods. The food cooking apparatus of the present invention enables the simple, easy and inexpensive frying and/or charbroiling of food while enabling the overall fat and grease content of the food to be greatly reduced.

The preferred embodiment of the present invention enables both frying and charbroiling of food with the same apparatus with minor modification of the equipment by the user. This combination fryer and charbroiler food cooking apparatus includes a container having a closed bottom and an open top and an inner wall surface. A container cover is affixed, preferably by a hinge, to the container for coveting, enclosing and sealing the container. A volume of cooking liquid is disposed in the container and heating elements are provided to heat the cooking liquid. A centering rod is mounted to the bottom of the container and emanates upwardly toward the open top of the container. A food basket, with an aperture therethrough, is slideably mounted to the centering rod via the aperture to permit the basket to move between a lower frying position and an upper spinning or charbroiling position. A lockable lifter bar is provided to move and secure the food basket in its upper and lower positions.

A charbroil basket cover is provided over the food basket which carries a number of cooking elements disposed on its underside. The cooking elements are positioned in spaced apart relation to one another defining gaps therebetween. An insert food support may be positioned within the food basket to carry food items for charbroiling. The insert food support includes upstanding members which reside in the gaps between the cooking elements between charbroiling. A motor is provided to drive a driveshaft which includes a first drive coupling which connects to a second drive coupling on the cover of the food basket. As a result, engagement of the motor rotates the drive shaft to, in turn, spin the food basket. A drive coupling extension may also be provided to enable the food basket to spin, via manual hand turning, when the basket is in its lower frying position.

In operation, to fry food for example, food is placed into the food basket and the cover is placed thereover to contain the food. The basket assembly is then threaded onto the centering rod to permit the basket to be lowered into the food cooking oil. The heating oil then cooks the food and then the lifter bar raises the basket from the cooking oil in order for the first drive coupling to communicate with the second drive coupling. The motor is engaged to spin the drive to, in turn, drive the first drive coupling to spin the basket at high speed to separate the oil, fat and grease from the food. The basket is then removed to permit removal of the finished cooked food items.

For charbroiling, the user makes the minor modification of changing the cover of the food basket to a charbroiling cover which includes charbroiling elements. A food support insert is placed into the food basket to receive and position food in an upstanding fashion. Upon installation of the cover, the charbroiling cooking elements reside between the upstanding food items. Upon activation of the cooking elements, charbroiling will occur while the basket is in its upper position. Spinning, as in the frying operation above, may be carried out during or after the charbroiling operation.

It is therefore an object of the present invention to provide a food cooking apparatus that can both charbroil and fry foods.

Another object of the present invention is provide a food cooking apparatus which can both charbroil and fry foods as well as spin the foods at a variable high rate of speed at various stages of cooking to separate fat and grease from the foods.

It is a further object of the present invention to provide a food cooking apparatus which can produce healthy food items despite the method of cooking and fat content of the food itself.

It is yet a further object of the present invention to provide an extremely safe food cooking apparatus which is easy to clean, maintain and operate by the end-user.

It is another object of the present invention to provide a food cooking apparatus which can be easily modified by the end-user to cook the food in a number of desired ways.

Another object of the present invention is to continuously filter spun out oil during the basket spinning process.

Yet another object of the present invention is prevent contamination of the fry oil by keeping contaminants, such as broken off breading, in the food basket.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
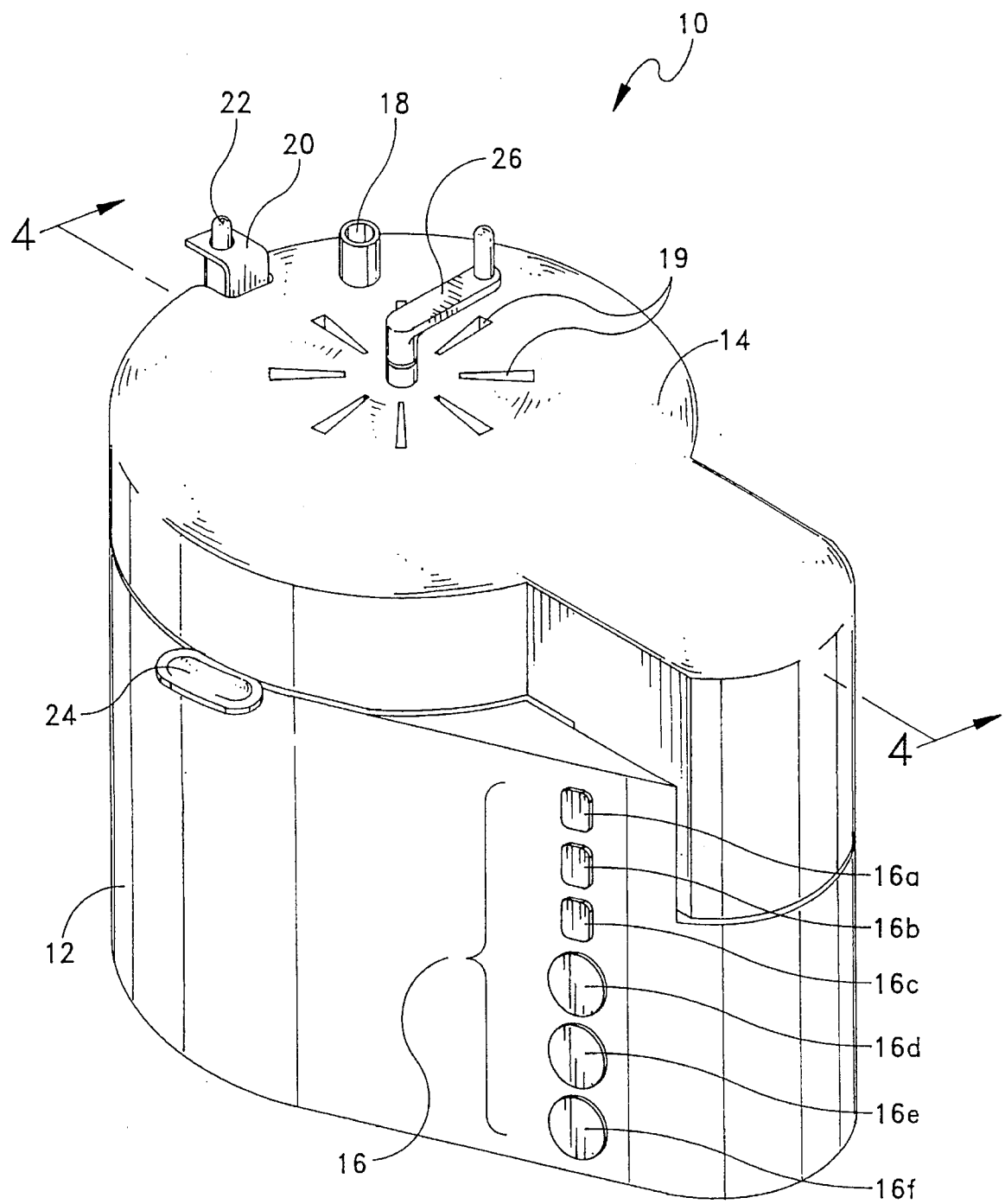
FIG. 1 is a perspective view of the combination charbroiler and fryer food cooking apparatus of the present invention.
Figure 2:
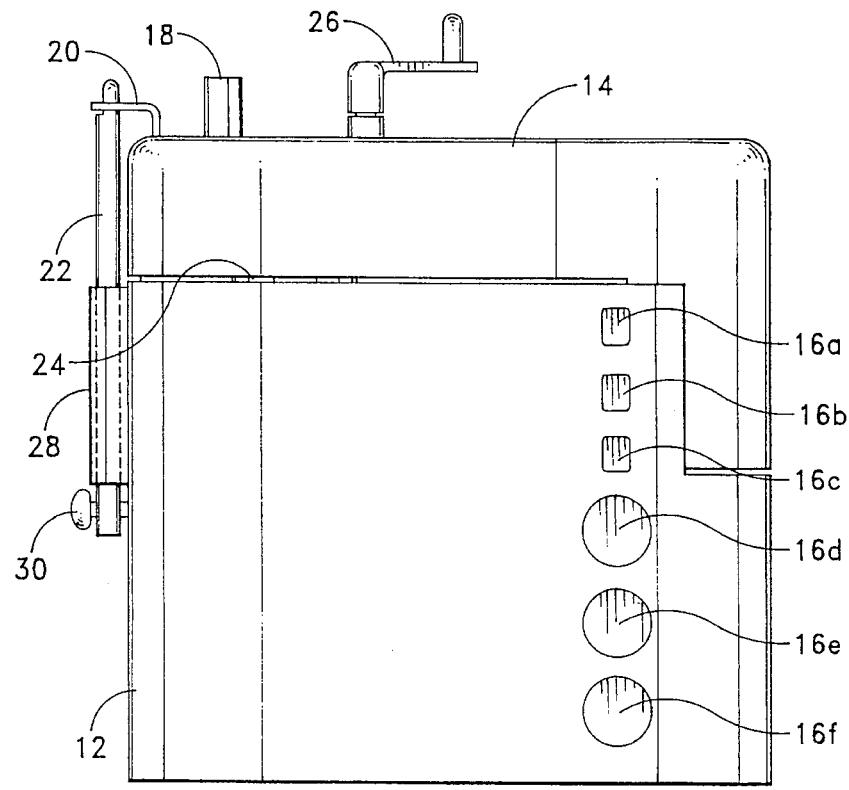
FIG. 2 is a front view of the invention shown in FIG. 1.
Figure 3:
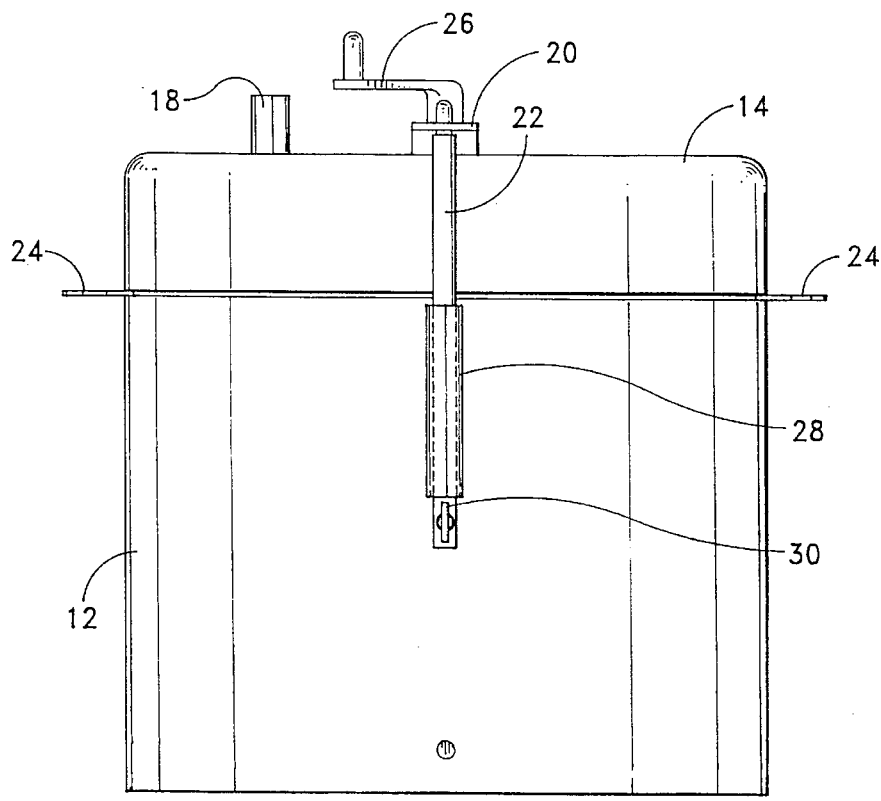
FIG. 3 is a left side view of the invention shown in FIG. 1.

Referring first to FIGS. 1–3, the exterior of the combination fryer and charbroiler food cooking apparatus of the present invention is shown. FIG. 1 shows a perspective view of food cooking apparatus 10 while FIG. 2 shows a front view and FIG. 3 shows the left side view of apparatus 10.

An outer housing 12 is provided with cover 14 hingedly affixed thereto. Control panel knobs 16a–16f, as will be described in detail below, control the operation of the apparatus. Further, lifting handles 24 are connected to the upper lip of cooking oil container 78 to facilitate removal and transport thereof, which will be described below in connection with FIG. 4. In addition, motor vent slots 19 and container vent 18 are provided to increase the efficiency of apparatus 10. As will be described in detail below, a rod guide 28 is provided on the exterior of housing 12 to guide lift rod 22 which is connected to lifting bracket 20. Lifting bracket 20 moves the food basket from its lower frying position to its upper spinning and/or charbroiling position. Spring loaded pin 30 serves as a lock to secure lifting bracket 20 and, thus, the food basket in its respective lower and upper positions. In addition, removable handle 26 is connected to a drive shaft, as described below, to enable manual spinning of the food basket during the frying/cooking operation.

Figure 4:
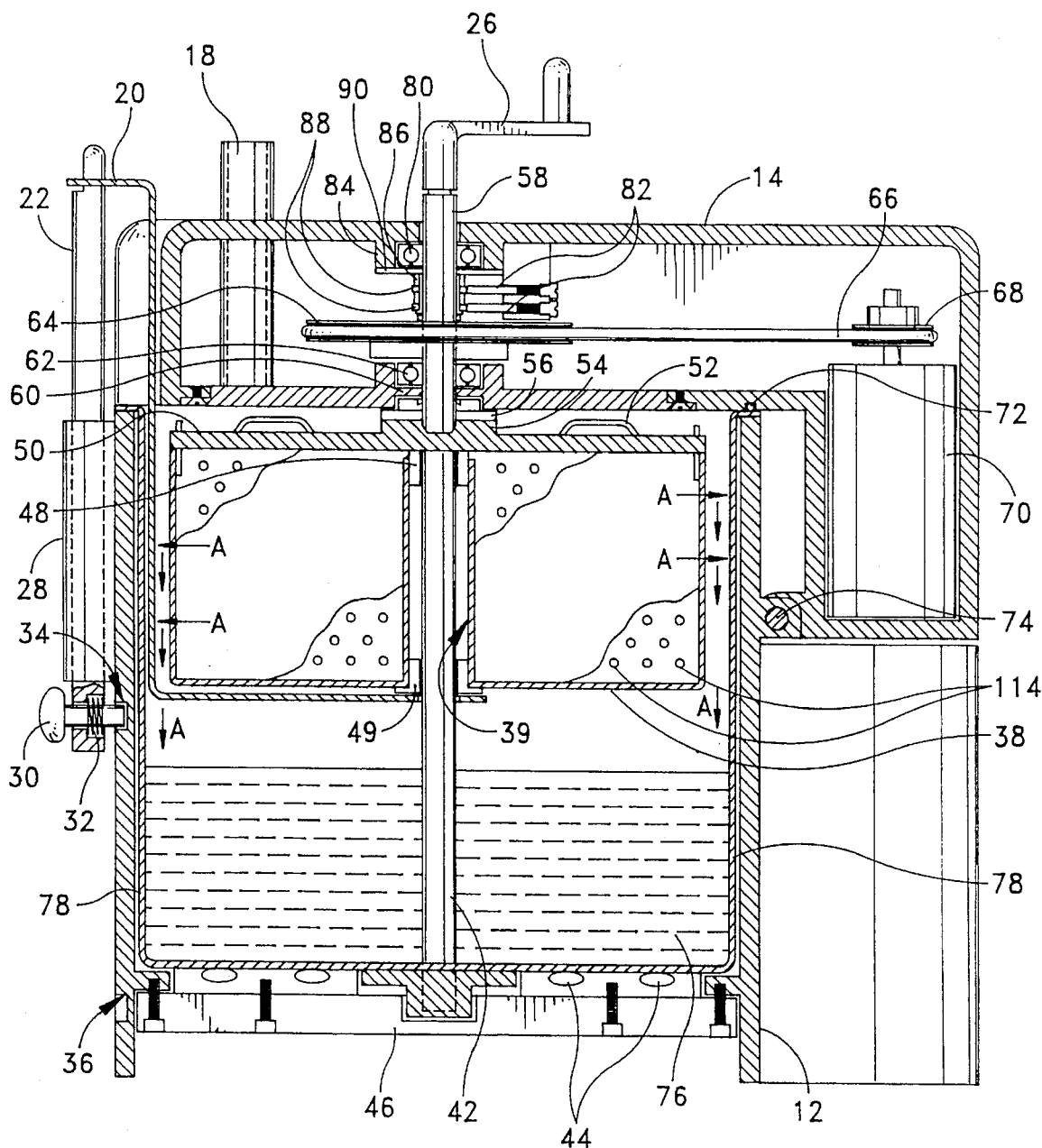
FIG. 4 is a cross-sectional view through the line 4—4 of FIG. 1 illustrating the food basket in its upper spinning position.

Turning now to FIG. 4, a cross-sectional view through the line 4—4 of FIG. 1 is shown to illustrate the inner construction of apparatus 10. In particular, FIG. 4 shows the food cooking apparatus 10 of the present invention in the spinning mode after frying which will be described in connection with FIG. 5 below. FIG. 4 illustrates removable cooking oil container 78 containing a volume of cooking oil 76. Cooking oil container 78 resides within housing 12. Heating elements 44 are provided below cooking oil container 78 and above insulation bottom member 46. Centering shaft 42 is connected the bottom center of cooking oil container 78 so as to emanate from the floor from cooking oil container up toward the opening thereof.

Rod guide 28 is mounted to the exterior of housing 12 to receive lift rod 22 therethrough. At the bottom terminal end of lift rod 22 is mounted a spring loaded pin 30 for engaging top notch 34 or lower notch 36. Lifting bracket 20 is connected to the top terminal end of lift rod 22 and extends into cooking oil container 78 for positioning under food basket 38. As a result of top notch 34 and lower notch 36, lifting bracket 20 may be secured into two positions, an upper spinning or charbroiling position as shown in FIG. 4 or, in the alternative, the lower cooking position as shown in FIG. 5 corresponding to the engagement of spring loaded pin 30 with bottom notch 36 as opposed to top notch 34 as in FIG. 4.

Still referring to FIG. 4, food basket 38, including perforations or holes 114, include central aperture 39 to permit threading over centering shaft 42 as well as mounting on lifting bracket 20. Top basket bushing 48 and bottom basket bushing 49 facilitates centering of food basket 38 and sliding along centering shaft 42. A fry basket cover 50 is provided to contain the food residing within food basket 38. Fry basket cover 50 includes handles 52 to facilitate removal of basket 38. Integrated into fry basket cover 50 is bottom fry basket cover coupling 54 for engagement with top coupling 56 which is connected directly to drive shaft 58. Drive shaft 58 is connected to adjustable speed motor 70 via drive pulley 64, belt 66 and motor pulley 68. Additionally, top bearing 80, thrush washer 86, brush holder 84, insulator 90, commutator rings 88 and brushes 82 are provided to bring power to the charbroiling elements 118 discussed in connection with FIG. 13. Each of these components, along with motor 70 preferably reside within cover 14 which affixed to housing 12 at hinge 74. Vent 18 is provided through cover 14 to vent fumes generated within housing 12 and, more specifically, cooking oil container 78. Additionally, a bottom bearing 62 and shaft seal 60 are provided along with O-ring seal 72 to seal cover 14 as well as seal the top open end of cooking oil container 78 upon closure of cover 14 via hinge 74.

Upon actuation of motor 70 via control panel buttons 16a–16f, the speed and timing of motor 70 may be controlled. As a result, drive shaft 58 will be driven without requiring the use of handle 26 which is removably connected to the top terminal end of shaft 58. The rotation of drive shaft 58, in turn, rotates top coupling 56 which is directly engaged with bottom fry basket cover coupling 54 at the time of fry cover 50 on basket 38 when basket 38 is in its upper spinning position when spin motor pin 30, spring-biased by spring 32, resides within top notch 34. As a result of the rotation of basket 38 about centering shaft 42 at, preferably 200–400 rpms, oil and grease will be separated from the food (not shown) and spun out from basket 38 in the general direction indicated by the arrows referenced "A". Such excess oil is separated and is routed back into the volume of cooking oil 76 residing at the bottom of cooking oil container 78.

Figure 5:
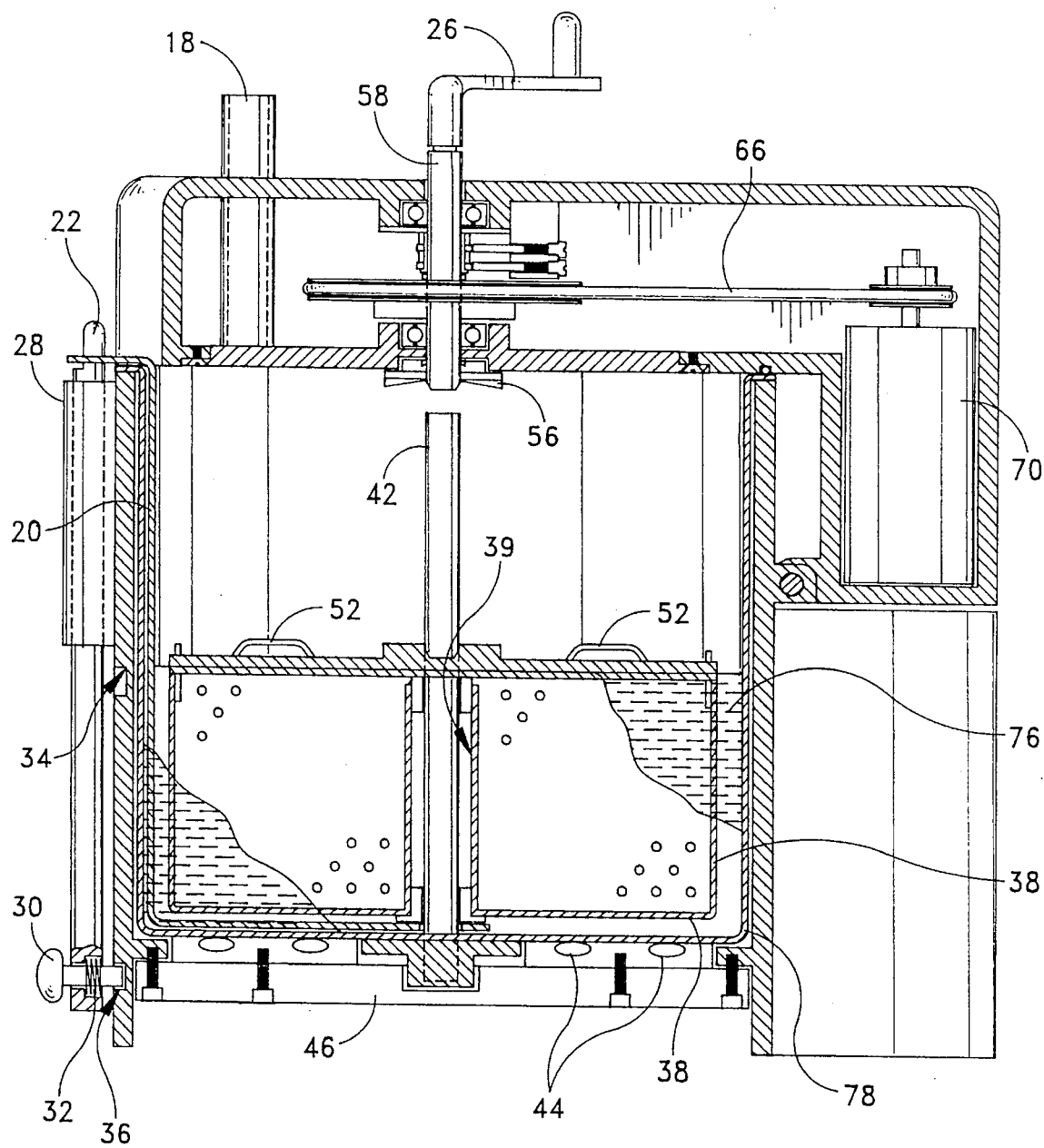
FIG. 5 is a cross-sectional view through the line 4—4 of FIG. 1 illustrating the food basket in its lower frying position.
Figure 6:
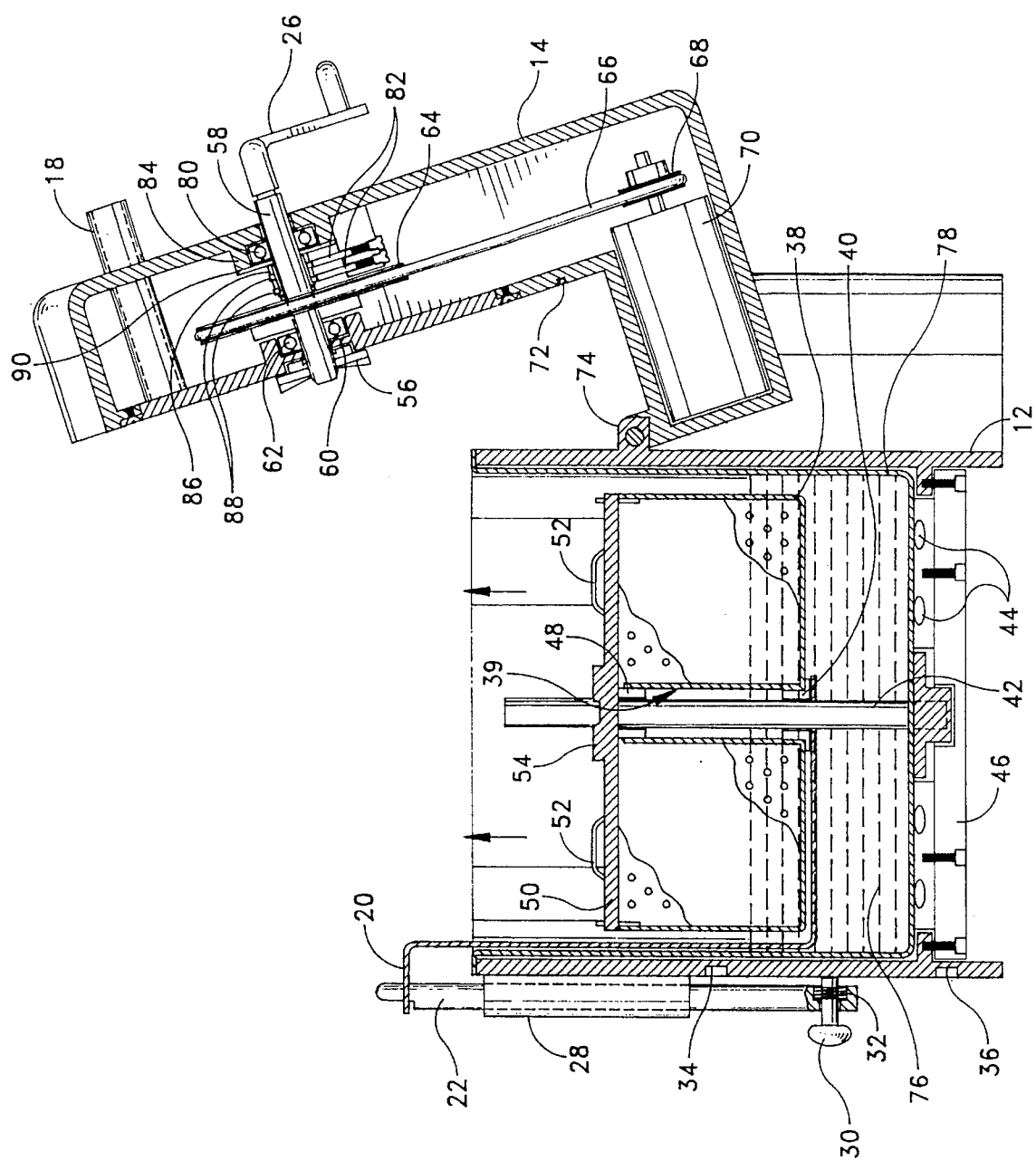
FIG. 6 is a cross-sectional view through the line 4—4 of FIG. 1 illustrating the apparatus in an open condition with the food basket sliding on the centering rod.
Figure 8:
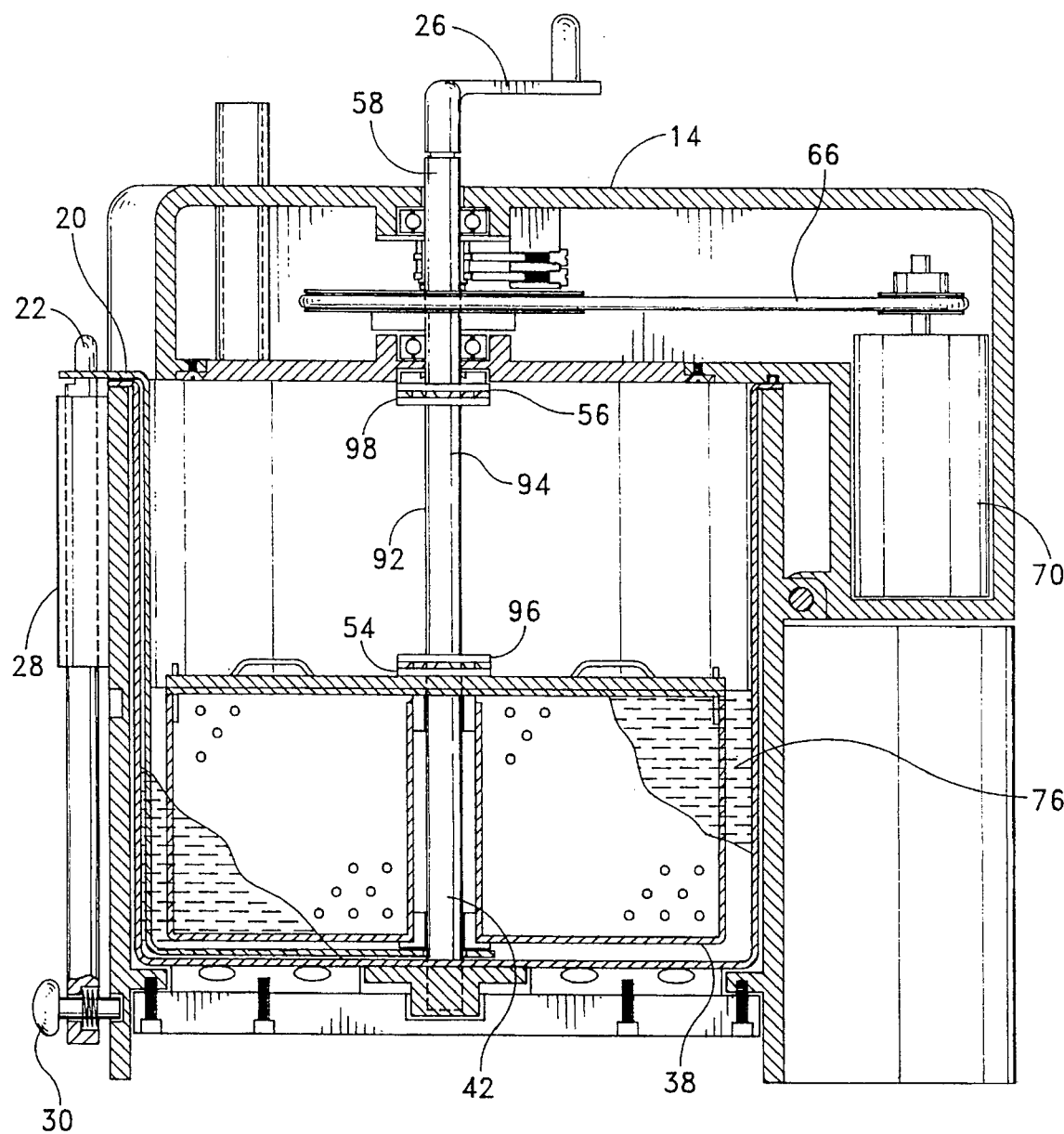
FIG. 8 is a cross-sectional view through the line 4—4 of FIG. 1 illustrating employing of the drive coupling extension and manual spinning.

Referring now to FIG. 5, the apparatus 10, of the present invention, is shown carrying out is frying operation. In contrast to FIG. 4, lift rod 22 has been lowered so that spring loaded pin 32 resides in lower notch 36 thus lowering lifting bracket 22 and food basket 38 resting thereon into a lower position. As a result, food basket 38, containing food therein, is lowered into cooking liquid 76 for frying. Heating elements 44, controlled by various knobs generally referenced at 16 to control the temperature and timing of the heating of cooking liquid 76. As can be understood, a timer can be enabled to shut off heat delivery to cooking liquid 76 via heating elements 44. Additionally, cooking time may be set to sound an alarm upon completion of the cooking time to alert the end-user to lift basket 38 out of cooking liquid 76 and move the cooking basket into its upper spinning position as shown in FIG. 4 in preparation of oil, fat and grease removal. FIG. 8 illustrates this process of lifting basket 38 containing now cooked food from cooking liquid 76 toward its upper position. This operation of moving food basket 38 into its upper spinning position is typically carried out while cover 14 is closed. FIG. 6 illustrates cover 14 in an opened condition to illustrate the hinged connection of cover 14 to housing 12.

Figure 7:
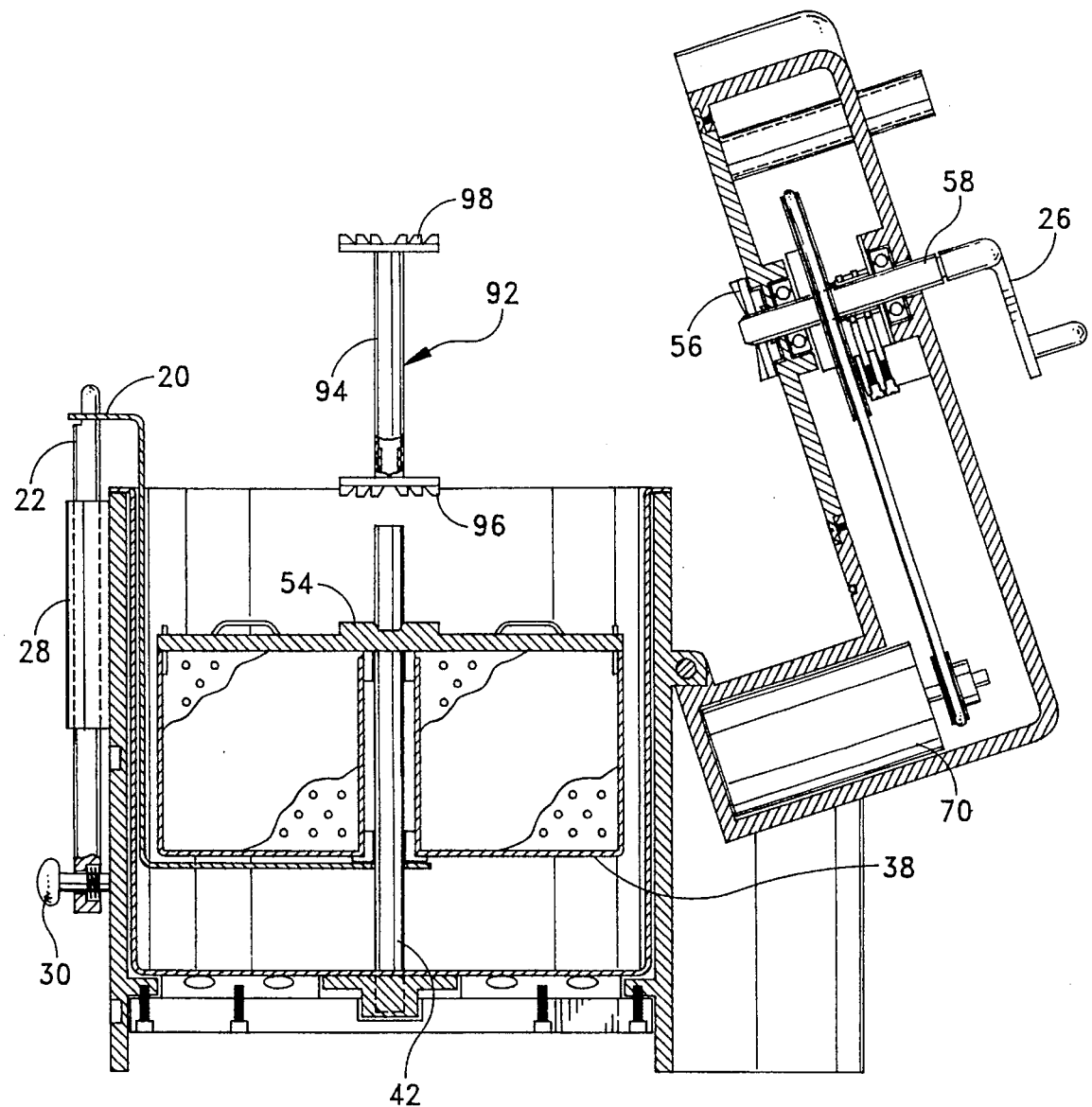
FIG. 7 is a cross-sectional view through the line 4—4 of FIG. 1 showing the apparatus in an open condition along with installation of the drive coupling extension.

While FIGS. 5 and 6 show the frying operation of the present invention, particularly the spinning of basket 38 after frying in its upper position, it may be desirable to rotate basket 38 during the frying process. FIG. 7 illustrates the employment of drive coupling extension 92 with a bottom extension 96 and a top extension coupling 98. Drive coupling extension 92 is routed over centering shaft 42 so bottom extension coupling 96 communicates with bottom fry basket cover coupling 54 while top extension 98 engages with top coupling 56. As a result, as shown in FIG. 8, drive coupling extension 92 provides extension shaft 94 between top coupling 56 and bottom coupling 54 to maintain the drive coupling with motor 70 even while food basket 38 is in its downward frying position.

In operation, fry basket 38 is lowered into hot cooking liquid 76 via lifting bracket 20. Cover 14 is closed to ensure engagement with drive shaft 58. Either motor 70, via its pulley and valt arrangement, can rotate basket 38 at a low rate or, in the alternative, the end-user may manually rotate drive shaft 58 by removable handle 26. As a result, food residing within food basket 38 can be slowly agitated during the frying process to improve cooking results.

Figure 9:
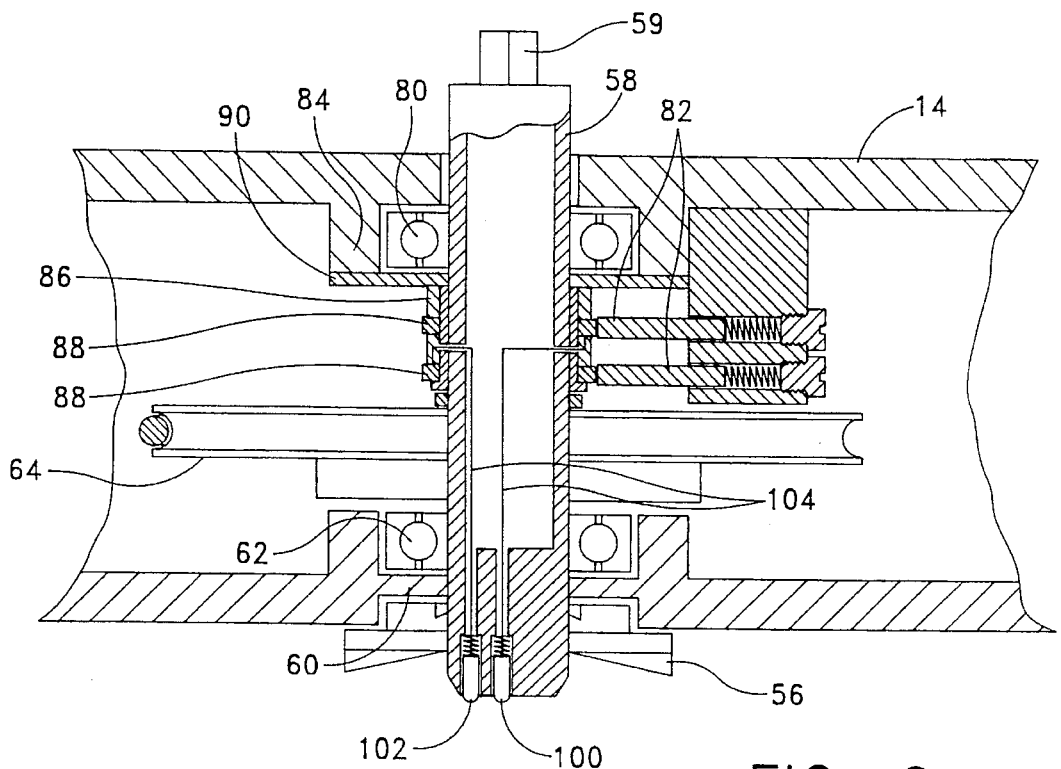
FIG. 9 is a cross-sectional view through the line 4—4 of FIG. 1 illustrating a close up of the driveshaft of the present invention.
Figure 10:
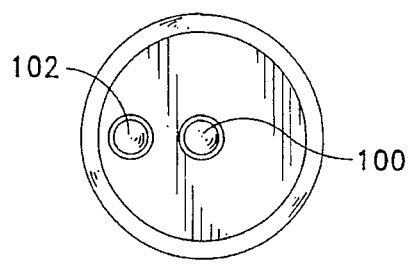
FIG. 10 is a bottom view of the driveshaft of the present invention.
Figure 11:
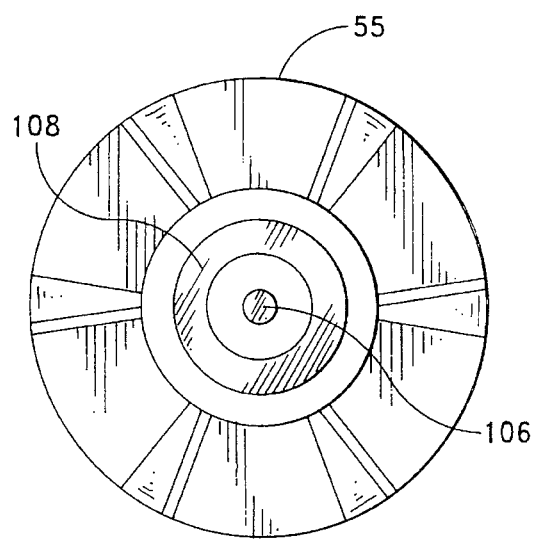
FIG. 11 is a top view of the basket cover drive coupling of the present invention.
Figure 13:
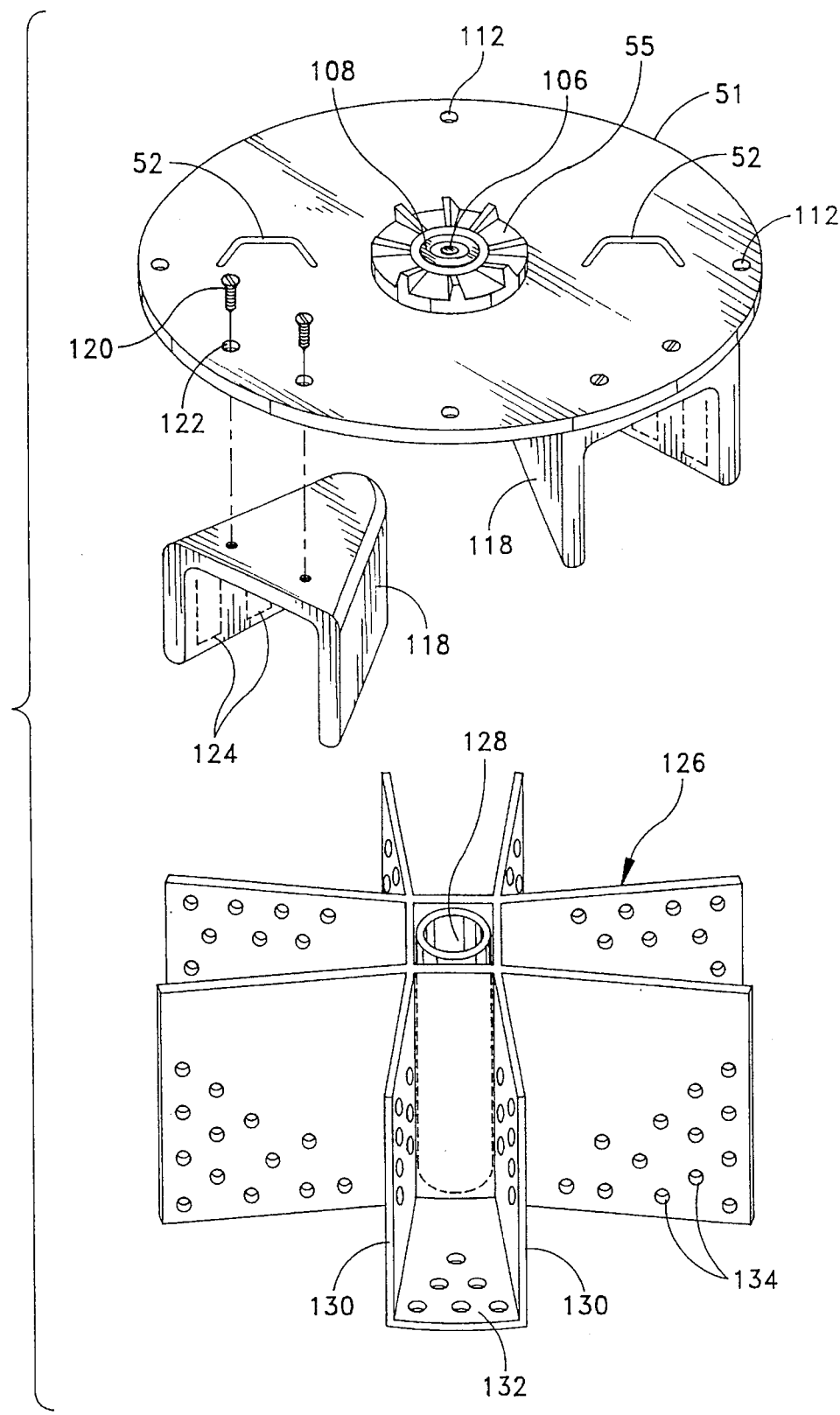
FIG. 13 is a perspective view of the charbroiler basket cover and insert food support assembly.

Referring now to FIGS. 9 and 10, details of the drive shaft 58 and its related components are shown in greater detail as previously described in connection with FIG. 4. In addition, drive shaft 58 includes center shaft electrical contact 100 and outer shaft electrical contact 102 deliver electrical power to charbroiling elements 118 via bottom charbroil basket cover coupling 55, as shown in FIG. 13. Electrical conductors 104 are provided for contacts 100 and 102, which interface with bottom charbroil basket cover coupling 55. FIG. 10 shows a bottom view of drive shaft 58 and contacts 100 and 102. Further, mounting post 59, which may be square in cross-section is provided for receiving removable handle 26. Referring to FIG. 11, the completion of the safety contact of the present invention is shown.

Figure 12:
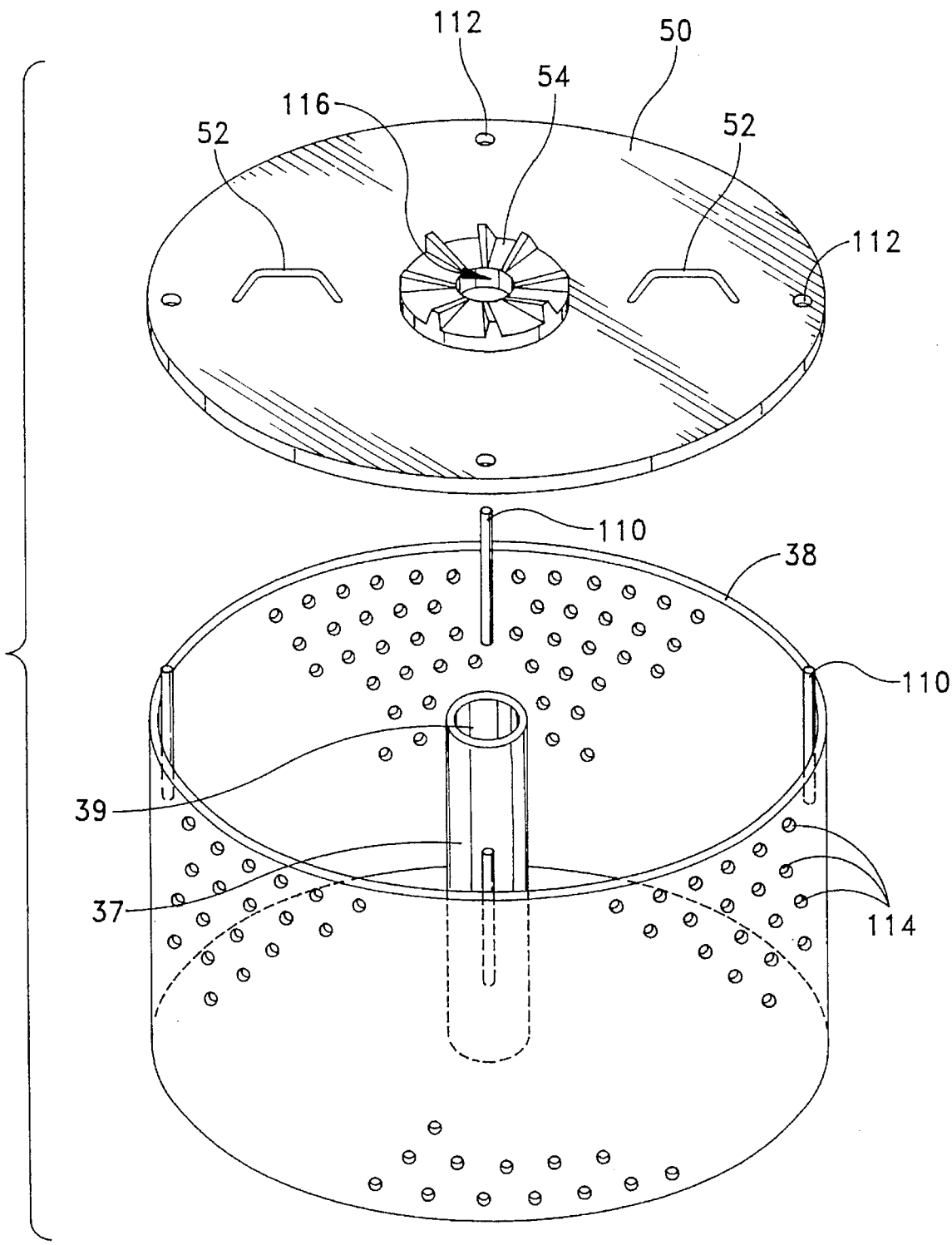
FIG. 12 is a perspective view of the food basket and cover for frying according to the present invention.

Referring now to FIG. 12, a perspective view of the fry basket 38 and fry cover 50 assembly is shown. Fry basket 38 is preferably cylindrical in configuration with an upstanding cylindrical wall 37 defining a central aperture 116 therethrough. Basket holes 114 are provided to permit grease and fat to be removed from basket 38 thereby reducing the grease and fat remaining within and on the food while keeping parts of the cooking batter and other matter within basket 38 so as not to contaminate oil 76. In addition, key pins 110 are provided for engagement with key apertures 112 through fry cover 50 to ensure proper alignment of cover 50 to basket 38. Disposed on fry cover 50 are a pair of cover handles 52 to facilitate removal of cover 50 from basket 38. Further, as described above, bottom coupling 54 is provided on fry cover 50 with aperture 116 in alignment with central aperture 38 for receipt of centering shaft 42 therethrough.

The basket and cover configuration illustrated in FIG. 12 is employed for carrying out a frying/cooking operation where basket 38 is lowered into cooking liquid 76, as described above. Alternatively, basket 38 can be easily modified to carry out the charbroiling function of the present invention. Referring to FIG. 13, a charbroiling assembly is generally shown. In particular, charbroiling insert food support 126 is provided for insertion into basket 38. Aperture 128 receives upstanding cylindrical wall 37 therethrough. As a result of insertion of insert food support 126 into basket 38, upstanding vertical plates 130 with holes 134 therethrough, define gaps between he respective pairs of vertical plates 130 which are bridged by floors 132. Therefore, food items, such as chicken, hamburgers, or the like, can be inserted between the respective pairs of vertical plates 130 in a spaced apart relation within basket 38.

During the charbroil operation, in accordance with the present invention, charbroil basket cover 51 is employed as opposed to fry basket cover 50. Charbroil basket cover 51 includes handles 51 and key apertures 112 in similar fashion to fry cover 50. However, charbroil basket cover includes charbroil cooking elements which are mounted to the underside of charbroil cover 51 preferably via screws 120 and holes 122. Electrical connection for heating elements 118 is provided via electrical conductors 104 to heating coils 124 which is connected to control panel 16 and computer control circuitry (not shown) for end-user control.

After insert food support 126 is placed within basket 38 and food is installed therein, between respective pairs of vertical plates 30, charbroil cover 51 is installed over basket 38 with charbroil cooking elements 118 residing within the gaps between each of the respective pairs of vertical plates 130. As a result, charbroil cooking elements 118 can be introduced close to each of the food items to be cooked.

When charbroiling, to provide electrical power to charboil elements 118, bottom charbroil basket cover coupling 55, as shown in FIGS. 11 and 13, a center coupling contact 106 is provided for electrical engagement with center electrical shaft contact 100 while outer coupling contact 108 is provided for electrical communication with outer electrical shaft contact 102. Contact 100 and 106 are substantially co-axial with drive shaft 58. Outer coupling contact 108 is provided in the shape if a ring so that the electrical connection can be made regardless of the rotational positioning of bottom charbroil basket cover coupling 55 at the time of closure of cover 14.

In operation, basket 38, with insert food support 126 and charbroil basket cover 51, is routed over centering shaft 42 and mounted onto lifting bracket 20 in similar fashion to the frying operation discussed in connection with FIGS. 4 and 5. This charbroiling configuration is preferably maintained in the upper spinning position where bottom coupling, which is affixed to charbroil fry basket cover 51, engages with top coupling 56 residing at the bottom of drive shaft 58. Via the control panel knobs 16, the charbroil elements are energized to cook the food residing within insert food support 126. Depending on the requirements of the end-user, food may be first charbroiled in the upper position, then spun in similar fashion to the frying operation above. Or, the food may be spun during the charbroiling operation employing the assembly shown in FIG. 13.

Figure 14:
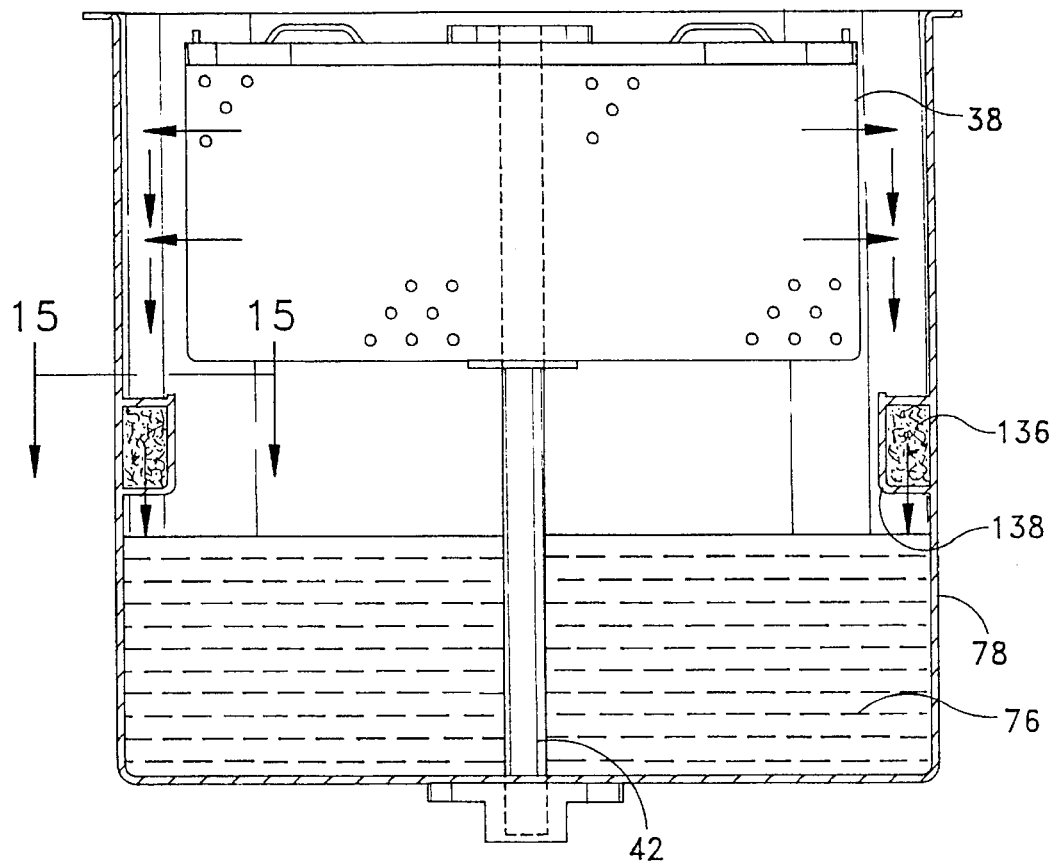
FIG. 14 is a part cross-sectional view of the container of the invention illustrating the circumferential filter trough.
Figure 15:
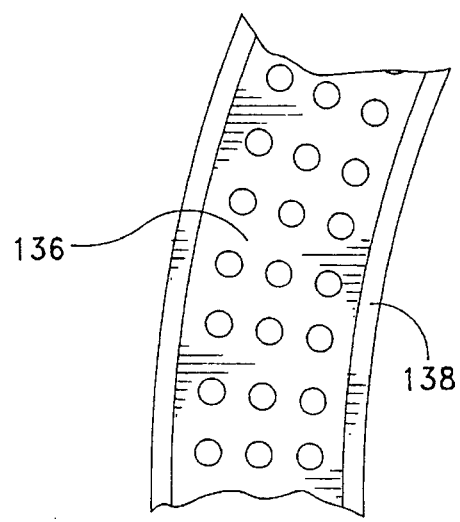
FIG. 15 is a cross-sectional view through the line 15—15 of FIG. 14.

FIGS. 14 and 15 illustrate an additional embodiment of the present invention where a circumferential filter trough 138 is employed. As seen in FIG. 14, the spinning of basket 38 in its upper position results in the ejection of unwanted fat, grease and oil which, by centrifugal force, this matter is directed to the outer periphery of cooking oil container 78 which, then, drips back down into the bottom of cooking oil container 78 to rejoin cooking liquid 76. Circumferential trough 138 includes filter media 136, such as stainless mesh, foam, sponge, or the like, to prevent any unwanted particles, such as broken pieces of fry batter and other parts of the food, from reentering cooking liquid 76. FIG. 15 shows a cross-sectional view through the line 15—15 of FIG. 14 to illustrate the circumferential positioning of trough 138 about the inner periphery of cooking oil container 78.

Figure 16:
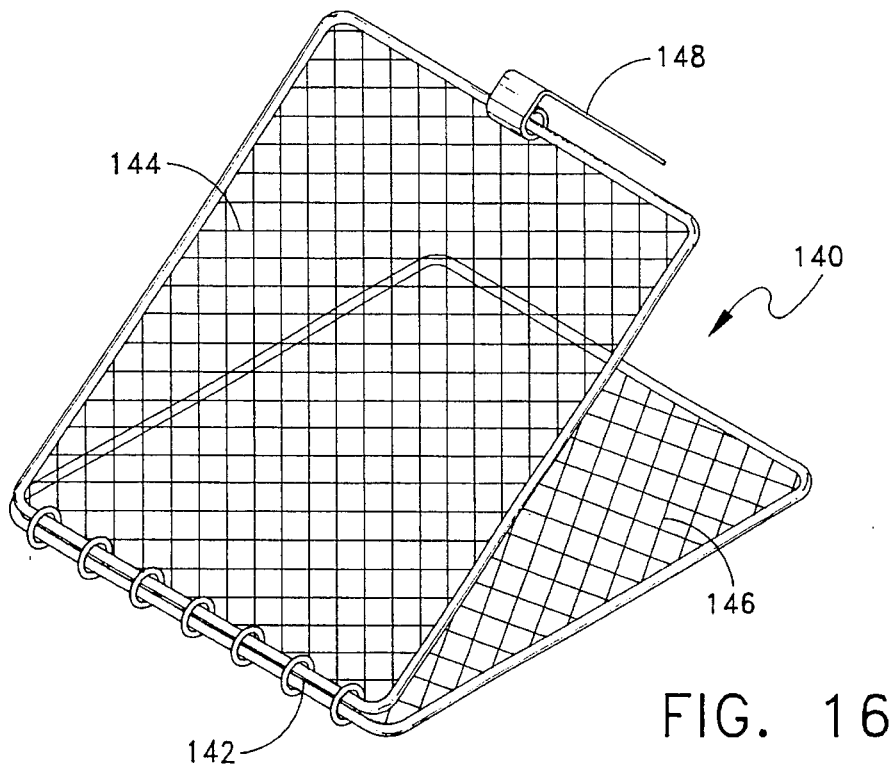
FIG. 16 is a perspective view of the auxiliary basket of the present invention.
Figure 17:
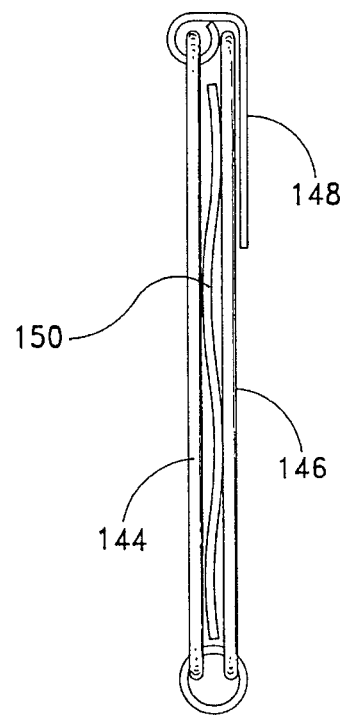
FIG. 17 is an end view of the auxiliary basket of FIG. 16 with flat food item disposed therebetween.

In addition, FIGS. 16 and 17 illustrate an auxiliary basket for flat food items, such as bacon and the like. Auxiliary basket 140 includes top half 144 and bottom half 146 connected thereto by hinge 142. As shown in FIG. 117, the food item 150 is placed between top half 144 and bottom half 146 and is secured closed by closure 148. Auxiliary basket 140, with food item 150 residing therein, can be placed either within basket 138 directly for frying or, in the alternative, within insert food support 126 for charbroiling, as described above. As a result, in view of the wide array of container configurations in accordance with the present invention, many different types and sizes of foods may be accommodated.

Figure 18:
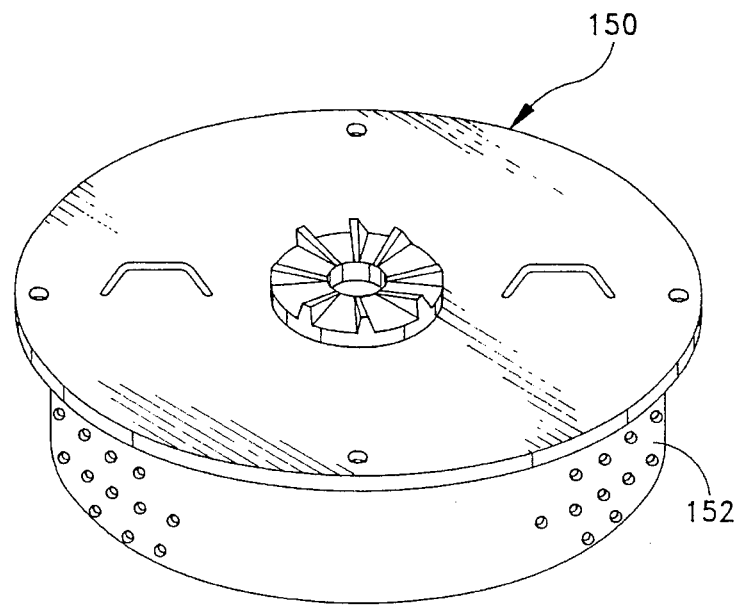
FIG. 18 is a perspective view of an alternative embodiment of the fry basket cover of the present invention.

FIG. 18 illustrates yet a further embodiment of the present invention with alternative fry basket cover 150. Cover 150 may be employed in place of cover 50 as shown in FIG. 12, for example. Use of cover 150 permits frying of smaller volumes of food in small volumes of cooking liquid 76. Spacer 152 is preferable made of the same material as basket 38 and fits within the top open end of basket 38. Spacer 152, reduces the volume of basket 38 for smaller frying jobs.

Figure 19:
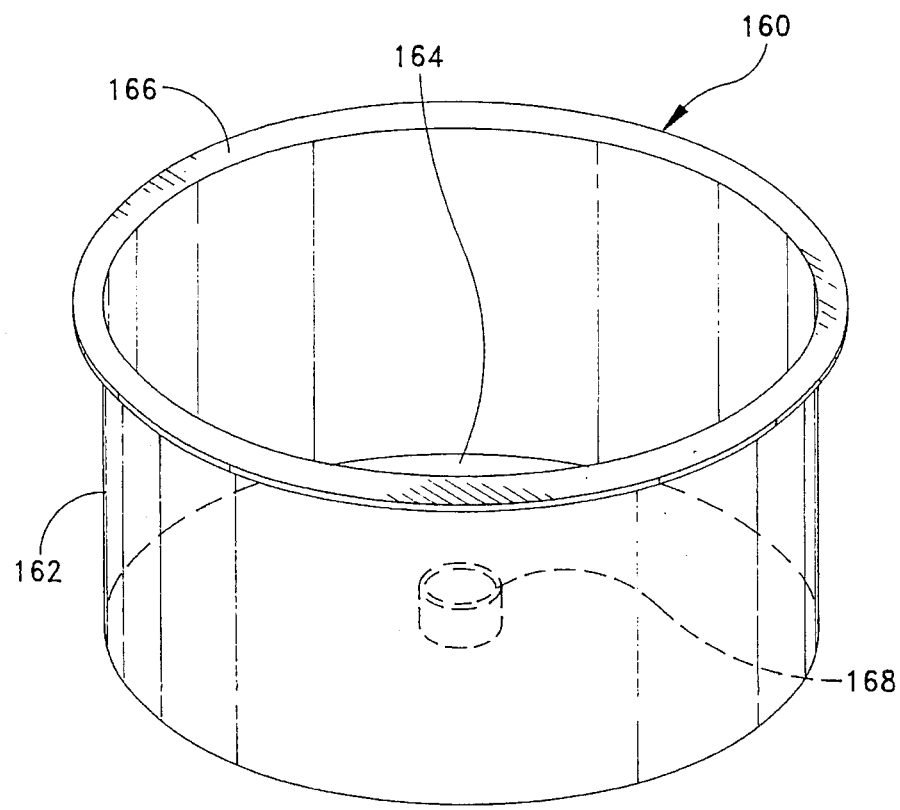
FIG. 19 is a perspective view of a broil fat collector for use with the present invention.

FIG. 19 shows a charbroil fat collector 160 which has a cylindrical body 162 with a floor 164, central aperture 168 and upper lip 166. Fat collector 160 is employed during the charbroiling process. It is used to protect fry oil 76 during the charbroiling cooking and subsequent spinning process. Fat collector 160 is routed over centering shaft 42 via aperture 168 so the cylindrical body is substantially co-axial with cooking oil container 78. Lip 166 sits on the upper lip of cooking oil container 78 to isolate and protect the cooking oil 76 thereunder.

In view of the combination fryer and charbroiler food cooking apparatus of the present invention an end-user will easily select the particular method for cooking his or her food with minor modification of the assembly of the invention. The present invention can employ the spinning method of fat reduction in not only fat foods but charbroiled foods as well. It is not uncommon for the fat content of fried food products to be reduced by about fifteen percent to forty percent by weight. The oil from the surface of the food product is separated out in addition to the oil within the food product itself. Such advantages can be realized during the charbroiling and spinning process of the present invention where fat found in the food product itself can be removed to make the overall product more healthy. The fat content of foods that are either fried or charbroiled can be reduced significantly by the centrifugal spinning forces in accordance with the present invention.

In accordance with the present invention, the overall speed and timing of spinning can be completely controlled by the end-user to accommodate various types of foods with various types of construction. For example, if a fired food is subject to centrifugal forces at high speeds, the product may be damaged and break apart. However, if the speed is too low, then the oil will not separate out enough and remain in the product as a result. Therefore, the adjustability of the present invention enables many different food items to be charbroiled and/or fried in accordance with the present invention.

It would be appreciated by those skilled in the art that various changes and modifications can be made to the illustrated embodiments without departing from the spirit of the present invention. All such modifications and changes are intended to be covered by the appended claims.

What is claimed is:

1. A fryer food cooking apparatus, comprising:

a container having a closed bottom, an open top and an inner wall surface;

a container cover affixed to said container capable of sealingly covering and enclosing said container;

a volume of cooking liquid disposed in said container;

a centering rod mounted to said bottom of said container and emanating upwardly toward said open top;

a food basket having a aperture therethrough; said food basket being slidably mounted to said centering rod via said aperture; said basket being movable between a lower cooking position and an upper spinning position;

a basket cover residing over said food basket;

a first drive coupling connected to said basket cover;

a drive shaft connected to said container cover;

an electric motor having a supply of electric current coupled to said drive shaft to rotate said drive shaft;

a second drive coupling connected to said drive shaft; said second drive shaft being engagable with said first drive shaft when said basket is in an upper spinning position;

whereby operation of said motor rotates said drive shaft to rotate said food basket when said basket is in it upper spinning position to remove excess cooking liquid from food residing in said food basket.

2. The fryer food cooking apparatus of claim 1, further comprising:

lock means for securing said food basket in said lower cooking position; and lock means for securing said food basket in said upper spinning position.

3. The fryer food cooking apparatus of claim 1, wherein speed of said motor is adjustable and rotation of said food basket is adjustable in its upper spinning position.

4. The fryer food cooking apparatus of claim 1, further comprising:

a drive coupling extension slidably receivable over said centering rod when said food basket is in said lower cooking position; said drive coupling being positioned between said first drive coupling and said second drive coupling to enable said food basket to rotate when said food basket is in said lower cooking position.

5. The fryer food cooking apparatus of claim 1, further comprising:

a removable handle connected to said drive shaft at and end opposite said second drive coupling.

6. The fryer food cooking apparatus of claim 1, further comprising:

means for heating said volume of cooking liquid disposed in said container.

7. The fryer food cooking apparatus of claim 1, further comprising:

means for filtering said excess cooking liquid disposed on said inner wall surface of said container.

8. A charbroiler food cooking apparatus, comprising:

a container having a closed bottom and an open top;

a container cover affixed to said container capable of sealingly covering and enclosing said container;

a centering rod mounted to said bottom of said container and emanating upwardly toward said open top;

a food basket having a aperture therethrough; said food basket being slidably mounted to said centering rod via said aperture;

a basket cover having an outer top side and an underside; said basket cover residing over said food basket;

at least one charbroiling cooking element disposed on said underside of said basket cover;

a first drive coupling connected to said basket cover on said outer top side;

a drive shaft connected to said container cover;

an electric motor having a supply of electric current coupled to said drive shaft to rotate said drive shaft;

a second drive coupling connected to said drive shaft; said second drive shaft being engagable with said first drive;

whereby operation of said motor rotates said drive shaft to rotate said food basket to remove excess cooking liquid from food residing in said food basket.

9. The charbroiler cooking apparatus of claim 8, wherein said food basket is rotated during a charbroiling cooking operation.

10. The charbroiler cooking apparatus of claim 8, herein said food basket is rotated after a charbroiling cooking operation.

11. The charbroiler cooking apparatus of claim 8, herein said food basket is rotated during a charbroiling cooking operation.

12. The charbroiler cooking apparatus of claim 8, wherein said at least one charbroiling cooking element includes a plurality of cooking elements disposed on said underside of said basket cover in spaced apart relation to one another defining interstitial gaps therebetween.

13. The charbroiler cooking apparatus of claim 12, further comprising:

an insert food support disposed in said food basket having a plurality of upstanding members capable of support food items, said upstanding members residing in said interstitial gaps between said plurality of charbroiling cooking elements, respectively upon installation of said basket cover on said food basket.

14. A combination fryer and charbroiler food cooking apparatus, comprising:

a container having a closed bottom, an open top and an inner wall surface;

a container cover affixed to said container capable of sealingly covering and enclosing said container;

a volume of cooking liquid disposed in said container;

means for heating said volume of cooking liquid disposed in said container;

a centering rod mounted to said bottom of said container and emanating upwardly toward said open top;

a food basket having a aperture therethrough; said food basket being slidably mounted to said centering rod via said aperture; said basket being movable between a lower position and an upper position;

lock means for securing said food basket in said lower position;

lock means for securing said food basket in said upper position;

a basket cover residing over said food basket; said basket cover having an underside and an outer side;

a plurality of cooking elements disposed on said underside of said basket cover in spaced apart relation to one another defining interstitial gaps therebetween;

an insert food support disposed in said food basket having a plurality of upstanding members capable of support food items, said upstanding members residing in said interstitial gaps between said plurality of charbroiling cooking elements, respectively upon installation of said basket cover on said food basket;

a first drive coupling connected to said basket cover;

a drive shaft connected to said container cover;

an electric motor having a supply of electric current coupled to said drive shaft to rotate said drive shaft;

a second drive coupling connected to said drive shaft; said second drive shaft being engagable with said first drive shaft when said basket is in an upper spinning position;

whereby operation of said motor rotates said drive shaft to rotate said food basket when said basket is in it upper spinning position to remove excess cooking liquid, oil and grease from cooked food residing in said food basket.

* * * * *